United States Patent
Tomala et al.

(10) Patent No.: US 12,379,008 B2
(45) Date of Patent: Aug. 5, 2025

(54) BRAKE ACTUATOR, IN PARTICULAR ELECTROMECHANICAL BRAKE ACTUATOR OF A COMMERCIAL VEHICLE

(71) Applicant: ZF CV Systems Europe BV, Brussels (BE)

(72) Inventors: Bartlomiej Tomala, Opole (PL); Peter Beier, Wunstorf (DE)

(73) Assignee: ZF CV Systems Europe BV, Brussels (BE)

( * ) Notice: Subject to any disclaimer, the term of this patent is extended or adjusted under 35 U.S.C. 154(b) by 460 days.

(21) Appl. No.: 17/781,852

(22) PCT Filed: Dec. 1, 2020

(86) PCT No.: PCT/EP2020/084065
§ 371 (c)(1),
(2) Date: Jun. 2, 2022

(87) PCT Pub. No.: WO2021/110651
PCT Pub. Date: Jun. 10, 2021

(65) Prior Publication Data
US 2023/0003271 A1 Jan. 5, 2023

(30) Foreign Application Priority Data
Dec. 5, 2019 (DE) .................. 10 2019 133 213.3

(51) Int. Cl.
*F16D 65/18* (2006.01)
*F16D 55/2255* (2006.01)
(Continued)

(52) U.S. Cl.
CPC ......... *F16D 65/18* (2013.01); *F16D 55/2255* (2013.01); *F16D 2121/24* (2013.01);
(Continued)

(58) Field of Classification Search
CPC ............. F16D 2125/28; F16D 2125/30; F16D 2125/32; F16D 2125/64; F16D 2125/70;
(Continued)

(56) References Cited

U.S. PATENT DOCUMENTS

| | | | |
|---|---|---|---|
| 4,858,729 A | * | 8/1989 | Crewson .................. F16D 51/22 188/205 R |
| 4,921,225 A | * | 5/1990 | Ludwig .................. E05F 1/1292 188/269 |

(Continued)

FOREIGN PATENT DOCUMENTS

| | | |
|---|---|---|
| CN | 1786506 A | 6/2006 |
| CN | 104343970 A | 2/2015 |

(Continued)

OTHER PUBLICATIONS

European Patent Office, Rijswijk, Netherlands, International Search Report of International Application No. PCT/EP2020/084065, Mailed Mar. 18, 2021, 3 pages.

*Primary Examiner* — Bradley T King
(74) *Attorney, Agent, or Firm* — Dickinson Wright PLLC

(57) ABSTRACT

A brake actuator (1, 1') includes a casing (10), an electric motor for providing a driving torque, a cam disc (20) rotatably mounted to the casing (10) and operatively coupled to the electric motor, and a push rod (30) received in the casing (10), and configured to reciprocate in a longitudinal direction (100) between a retracted position (300) and an extended position (400). The push rod (30) and the cam disc (20) are operatively coupled such that a rotational movement of the cam disc (20) causes a linear movement of the push rod. A guiding member (40), in particular a bushing, is mounted to the casing (10), wherein the guiding member (40) guides the movement of the push rod (30) in the longitudinal direction (100).

19 Claims, 6 Drawing Sheets

(51) Int. Cl.
*F16D 121/24* (2012.01)
*F16D 125/28* (2012.01)
*F16D 125/58* (2012.01)
*F16D 125/64* (2012.01)
*F16D 125/70* (2012.01)

(52) U.S. Cl.
CPC .... *F16D 2125/28* (2013.01); *F16D 2125/582* (2013.01); *F16D 2125/64* (2013.01); *F16D 2125/70* (2013.01)

(58) Field of Classification Search
CPC ........... F16D 2125/582; F16D 2121/24; F16D 65/18; F16D 55/2255
See application file for complete search history.

(56) References Cited

U.S. PATENT DOCUMENTS

| | | | | |
|---|---|---|---|---|
| 8,696,208 | B1* | 4/2014 | Everline | F16D 65/22 |
| | | | | 384/129 |
| 2004/0026195 | A1* | 2/2004 | Baier-Welt | B60T 13/746 |
| | | | | 188/158 |
| 2007/0029144 | A1* | 2/2007 | Sekiguchi | F16D 65/18 |
| | | | | 188/72.8 |
| 2020/0062230 | A1* | 2/2020 | Henning | F16D 65/18 |
| 2021/0054888 | A1* | 2/2021 | Henning | F16D 65/028 |
| 2021/0403057 | A1* | 12/2021 | Basha | F16D 65/28 |
| 2022/0203952 | A1* | 6/2022 | Beier | F16D 65/183 |
| 2022/0297659 | A1* | 9/2022 | Beier | B60T 13/741 |
| 2022/0363231 | A1* | 11/2022 | Weh | B60T 8/4031 |

FOREIGN PATENT DOCUMENTS

| | | |
|---|---|---|
| CN | 105333038 A | 2/2016 |
| CN | 107810343 A | 3/2018 |
| CN | 108869564 A | 11/2018 |
| CN | 110291310 A | 9/2019 |
| CN | 110520647 A | 11/2019 |
| DE | 4228947 A1 | 3/1994 |
| DE | 19506955 C1 | 6/1996 |
| DE | 10103295 C1 | 9/2002 |
| DE | 102006027039 A1 | 12/2007 |
| DE | 102009029594 A1 | 3/2011 |
| DE | 102014226248 A1 | 6/2016 |
| DE | 102016210757 B3 | 6/2017 |
| DE | 102016207237 A1 | 11/2017 |
| DE | 102017004436 A1 | 11/2018 |
| DE | 102018114971 A1 | 12/2019 |
| EP | 3118075 A1 | 1/2017 |

\* cited by examiner

BRAKE ACTUATOR, IN PARTICULAR ELECTROMECHANICAL BRAKE ACTUATOR OF A COMMERCIAL VEHICLE

FIELD

The present disclosure relates to a brake actuator, in particular an electromechanical brake actuator of a commercial vehicle.

BACKGROUND

Brake actuators of aforementioned type are known in the art. They are used in automotive industry and in particular in the truck industry. DE 10 2017 004 436 A1 discloses for example such an electromechanical brake actuator having a cam disc and a push rod, which have coupling surfaces in contact with each other, which slide or roll against each other for direct transmission of the drive torque between cam disc and push rod.

In brake actuators of the aforementioned type, an electric motor provides a driving torque upon receiving a brake signal provided, for example, by a foot pedal. The driving torque is transmitted by a rotational movement of the cam disc to a push rod. Advanced by the rotational movement of the cam disc, the push rod moves towards its extended position to transmit a braking force to a braking disc.

In such a brake actuator, the push rod and the cam disc are operatively coupled such that the rotational movement of the cam disc causes a linear movement of the push rod. Furthermore, the rotational movement of the cam disc causes a pivoting movement in a predefined angle range. This inclination results in stresses and friction acting on the casing when the push rod is moving between its retracted and extended position, thereby potentially reducing the otherwise obtainable service life of the brake actuator.

Accordingly, it has been an object of the present disclosure to provide a brake actuator that overcomes the aforementioned challenges as much as possible. In particular, it has been an object to provide a brake actuator having an increased wear resistance and increased service life.

In one aspect, the present disclosure solves the underlying problem for a brake actuator of the initially mentioned type by providing that a guiding member, in particular a bushing, is mounted to the casing, wherein the guiding member is configured to guide the movement of the push rod in a longitudinal direction. The present disclosure is based upon the realization that such a guiding member provides an increased wear resistance thereby protecting the casing against stresses and friction. Accordingly, in such a brake actuator a cost-efficient material can be chosen for the casing.

In a particularly preferred embodiment, the guiding member has a first contact surface, and the push rod has a corresponding second contact surface that is in sliding contact with the first contact surface. By having such contact surfaces, a low friction guiding of the movement of the push rod in the longitudinal direction is provided. Such contact surfaces can, for example, have special coatings in order to reduce the friction and to increase the wear resistance.

Preferably, the first contact surface is curved, preferably being part-cylindrical or cylindrical. By providing a curved contact surface, sharp edges and the like are avoided, thereby increasing the wear resistance and consequently the service life.

Preferably, the second contact surface has a corresponding curvature, preferably being part-spherical. By providing that the second contact surface has a curvature corresponding to the curvature of the first contact surface, the guidance of the push rod is further improved and the wear resistance and consequently the service life is increased, as sharp edges and the like at the second contact surface are also avoided.

In a further preferred embodiment, the guiding member has at least one slot extending in the longitudinal direction and configured to receive the cam disc at least partially. By providing a slot, the arrangement of the casing, the guiding member, and the cam disc is more compact and the required space for the brake actuator is reduced. Further, the guiding member provides a sufficient guidance for the push rod, as the slot has no significant influence on the sliding contact of the guiding member and the push rod.

Preferably, the slot is a first slot and the guiding member further has a second slot extending in longitudinal direction, wherein the second slot is arranged opposite to the first slot, and wherein the first and second slots are configured to receive the cam disc at least partially.

Preferably, the first and second slots have a width that corresponds to the thickness of the cam disc. Hence, the contact surface for guiding push rod can be maximized, as the width of the slot reducing the contact surface is only as large as required for receiving the cam disc.

Preferably, the guiding member is at least partially arranged in the casing. By arranging the guiding member at least partially in the casing, the arrangement is more compact and the guiding member can easily be integrated in the casing.

Preferably, the guiding member is mounted to the casing in a non-positive connection, preferably in a press fit. Thus, the present disclosure advantageously recognizes that a non-positive connection is a cost-effective, secure, and easy-to-handle solution to mount the guiding member to the casing. In particular, a press fit is easy to manufacture and can be integrated in the brake actuator by pressing the guiding member into the casing before inserting the push rod in the casing.

In a further preferred embodiment, the brake actuator further includes a return spring operatively coupled to the push rod, and effective to urge the push rod towards its retracted position. By providing such a return spring, the present disclosure advantageously recognizes that the guidance of the push rod, and especially of a rod portion of the push rod that extends in the longitudinal direction, is improved. Further, the push rod will automatically rest in its retracted position until a driving torque is applied by the electric motor.

Preferably, the guiding member has a first face end facing the cam disc and a second face end facing away from the cam disc, and the guiding member further includes a projection of the second face end extending radially inwards. Such a projection provides a sufficient mounting and/or supporting interface. As the projection extends radially inwards, the guiding member is more compact.

Preferably, the return spring is mounted inside the guiding member against the projection. Thus, the projection provides a spring seat for the return spring. By mounting the return spring in the guiding member, the movement of the return spring for expanding and retracting is guided by the guiding member. Furthermore, a more compact arrangement of the return spring and the guiding member is provided, thereby reducing the installation space of the brake actuator.

Preferably, the guiding member is formed partially or completely of a material having a high strength and a low friction coefficient, preferably steel or high strength polymer. Hence, the wear resistance and consequently the service life is further improved.

In a further preferred embodiment, the brake actuator includes a pivot lever configured for applying a braking force on a brake disc, wherein the pivot lever and the push rod are engaged such that the linear movement of the push rod advances a pivoting movement of the lever. Such a lever provides a sufficient transmission of the linear movement of the push rod, due to the rotational movement of the cam disc, to a braking disc by urging a pair of braking pads towards the braking disc.

The present disclosure has been described in a first aspect with respect to a brake actuator. In a second aspect, the invention also relates to the use of a guiding member for a brake actuator according to the preferred embodiments of the present disclosure described above, wherein the casing has a first mounting interface, and the guiding member has a second mounting interface that corresponds to the first mounting interface, wherein the second mounting interface is configured to be engaged with the first mounting interface for mounting the guiding member to the casing.

According to the second aspect, the present disclosure solves the initially mentioned problem in that the guiding member is used to guide the movement of the push rod in the longitudinal direction. By using such a guiding member, the wear resistance is improved, thereby increasing the service life of such a brake actuator. The examples and preferred embodiments of the brake actuator of the first aspect as described above are also the preferred examples and preferred embodiment of the use of a guiding member for such a brake actuator and vice versa.

BRIEF DESCRIPTION OF THE DRAWINGS

For a more complete understanding of the present disclosure, the present disclosure will now be described in detail with reference to the accompanying drawings, in which.

DETAILED DESCRIPTION

Figure 1:
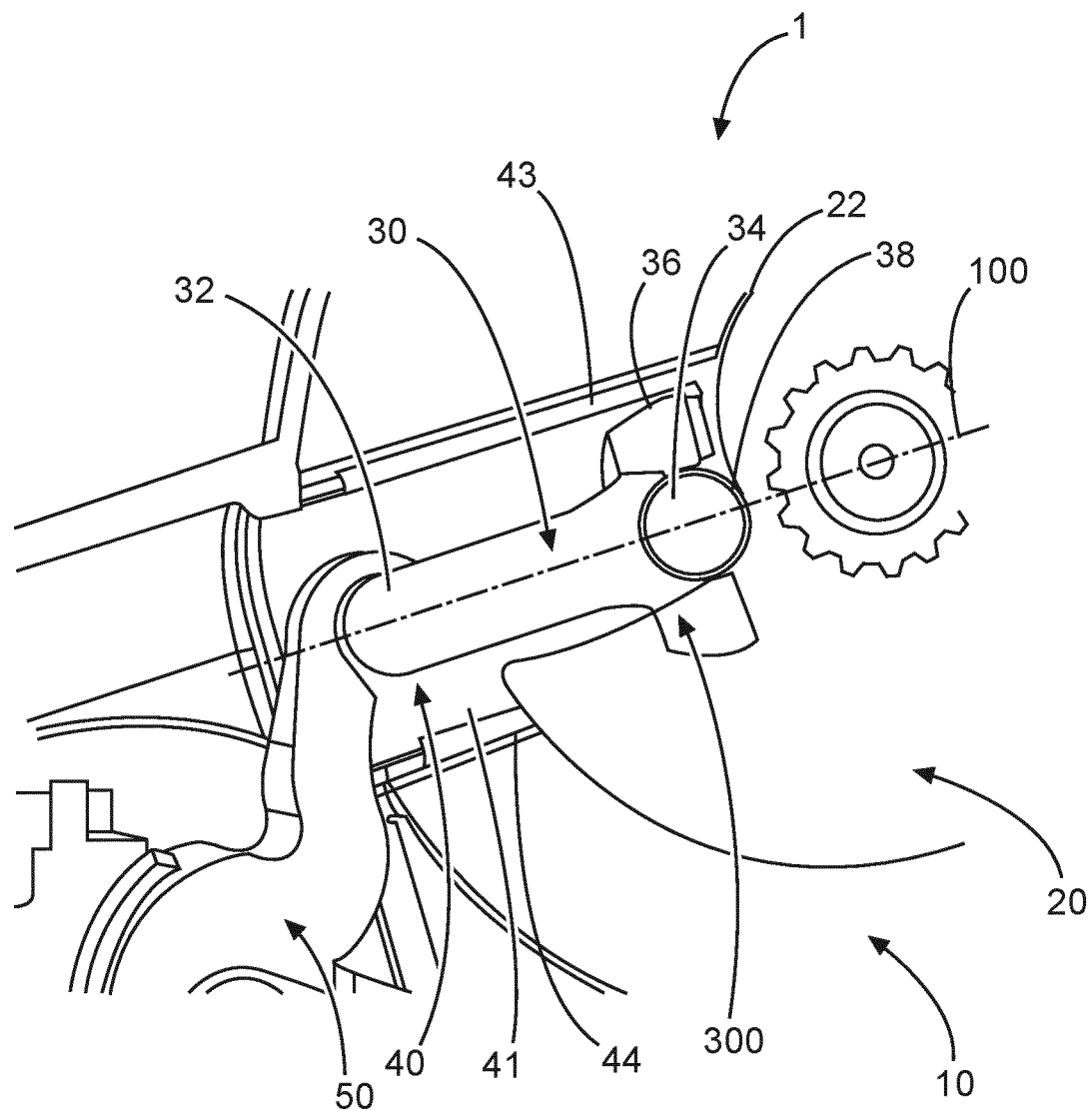
FIG. 1 is a sectional view of a brake actuator according to a first embodiment in a retracted position.
Figure 2:
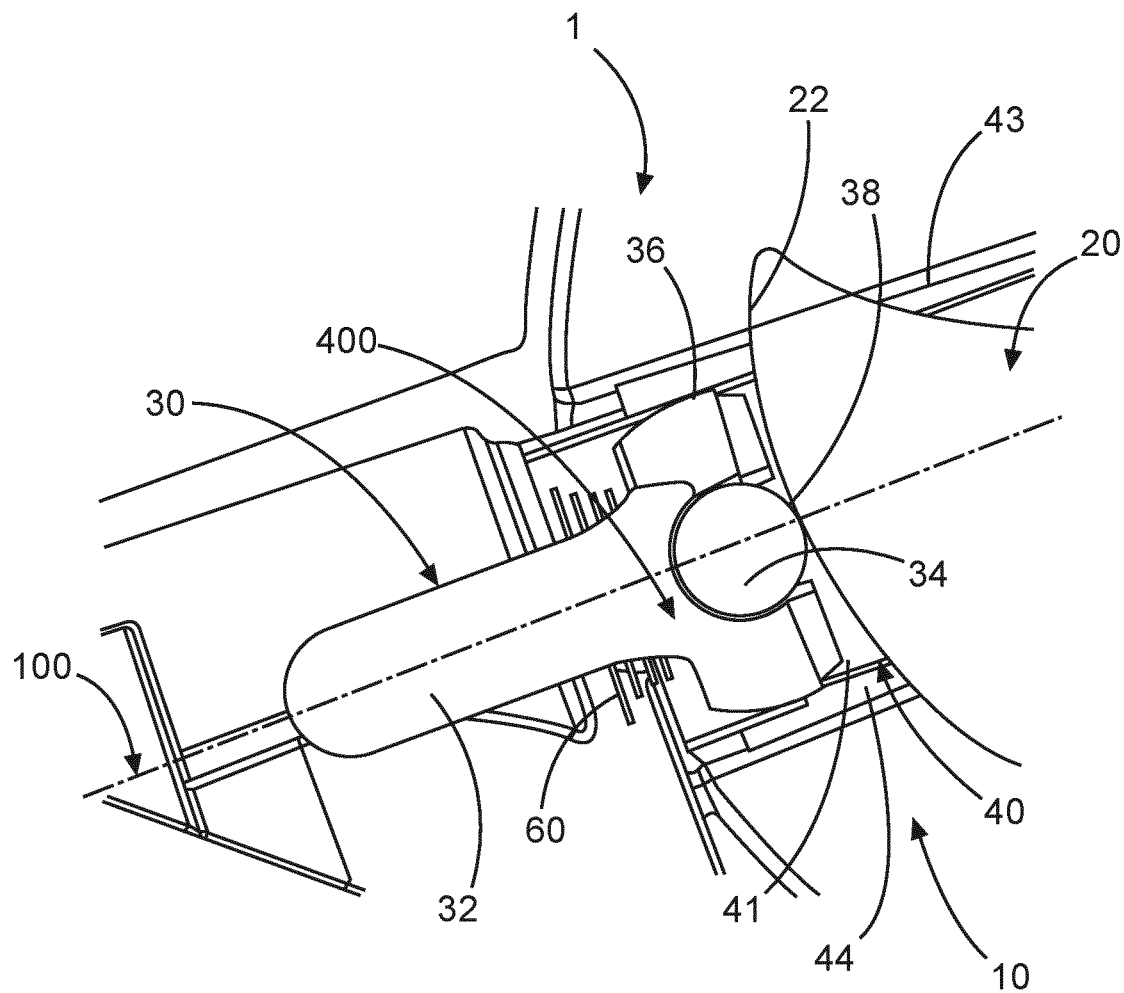
FIG. 2 is a sectional view of the brake actuator according to FIG. 1 in an extended position.

The brake actuator 1 shown in FIGS. 1 and 2 includes a casing 10, a cam disc 20 rotatable mounted to the casing 10, a push rod 30, and a guiding member 40 mounted to the casing 10, wherein the push rod 30 is received in the guiding member 40. The brake actuator 1 further includes a lever 50 operatively coupled to the push rod 30.

FIG. 1 illustrates the brake actuator 1 and in particular the push rod 30 in its retracted position 300, and FIG. 2 illustrates the brake actuator 1 in its extended position 400.

The cam disc 20 has a coupling surface 22 in slidable contact with the push rod 30 for transmitting a driving torque applied by an electric motor (not shown) to the push rod 30.

The push rod 30 has a rod portion 32 operatively coupled to the lever 50 and a guiding portion 34 in slidable contact with the guiding member 40. The push rod 30 and in particular the guiding portion 34 further has a contact surface 36 in sliding contact with the guiding member 40. The push rod 30 has a coupling surface 38 configured for slidable engagement with the corresponding coupling surface 22 of the cam disc 20 such that the push rod 30 is moved forth in a longitudinal direction 100 from its retracted position 300 to its extended position 400 (FIG. 2).

The guiding member 40 has a first contact surface 41 that corresponds to the contact surface 36 of the push rod 30 for being in slidable contact.

The guiding member 40 further has a first slot 43 and a second slot 44 extending in the longitudinal direction and arranged opposite to each other. The first slot 43 is arranged and dimensioned such that that the cam disc 20 is at least partially received in the slot 43 when the push rod 30 is in its extended position 400 (FIG. 2). The second slot 44 is arranged and dimensioned such that the cam disc 20 is at least partially received in the slot 44 when the push rod 30 is in its retracted position (FIG. 1). The slots 43, 44 have a width 46 (FIG. 5) that corresponds to the thickness 24 (FIG. 5) of the cam disc 20.

FIGS. 3 to 6 illustrate a brake actuator 1' according to a second embodiment.

Figure 3:
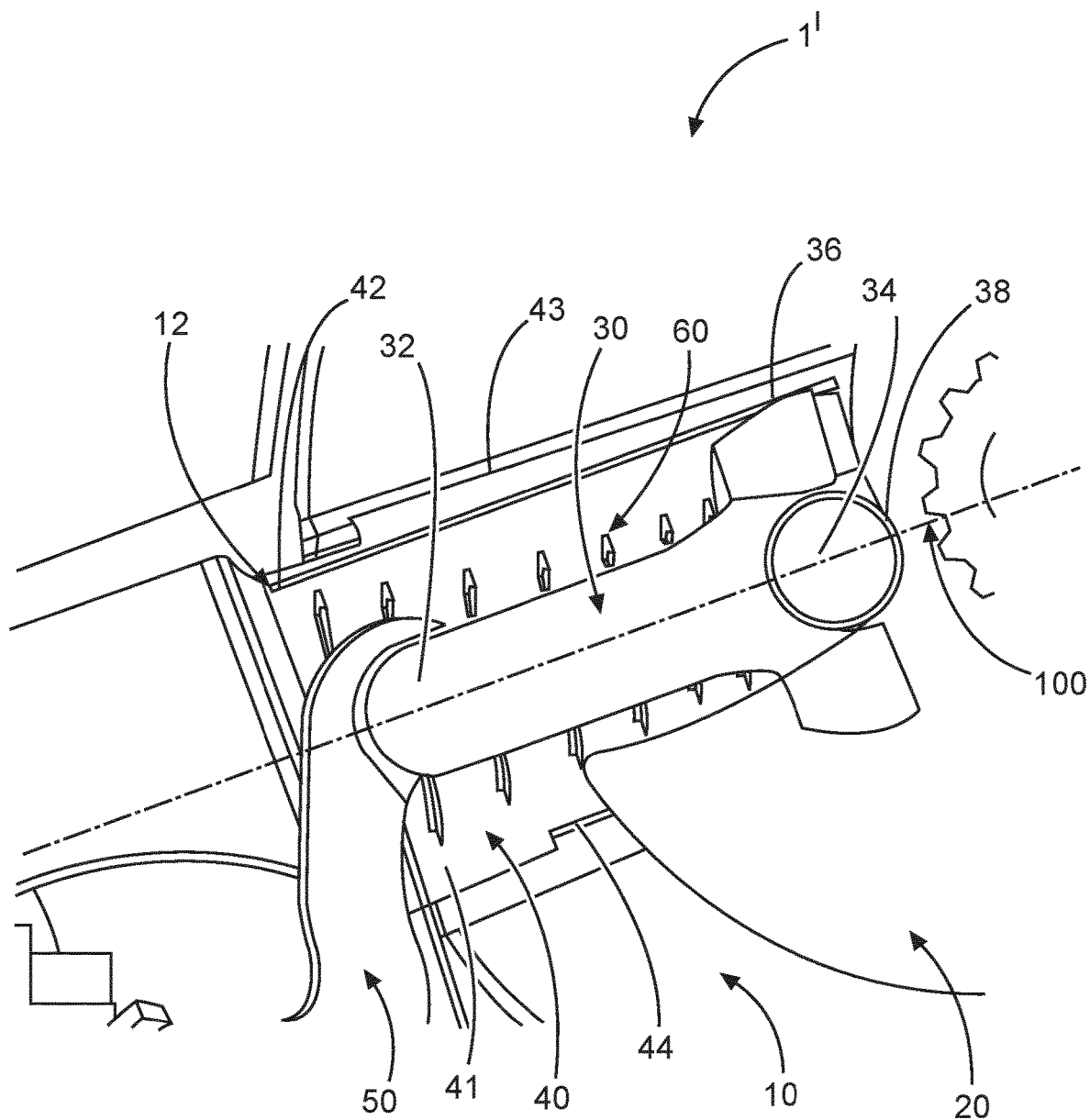
FIG. 3 is a sectional view of a brake actuator according to a second preferred embodiment.

The brake actuator 1' shown in FIG. 3 differs from the brake actuator 1 shown in FIGS. 1 and 2 by having a return spring 60 operatively coupled to the push rod 30 and effective to urge the push rod 30 towards its retracted position 300.

Figure 4:
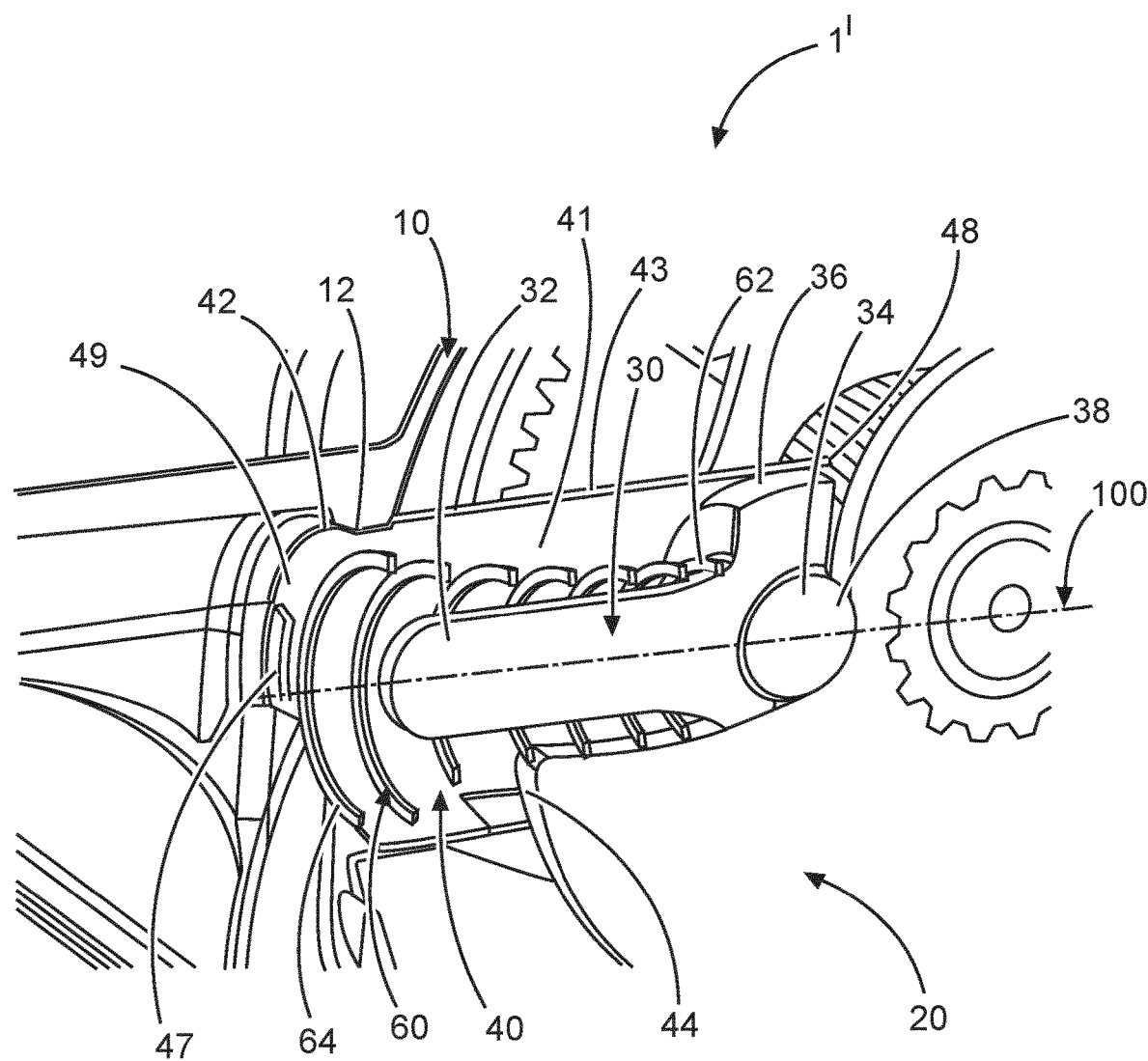
FIG. 4 is a perspective sectional view of the brake actuator according to FIG. 3.

As shown in FIG. 4, the guiding member 40 has a first face end 48 facing the cam disc 20 and a second face end 49 facing away from the cam disc 20. The guiding member 40 has a projection 47 at the second face end 49 extending radially inwards.

The return spring 60 is arranged in the guiding member 40, wherein the return spring 60 encloses the rod portion 32 of the push rod 30 at a lateral end 62 of the return spring 60. The spring seat 64 for the return spring 60 is provided by the projection 47, wherein the diameter of the return spring 60 tapers from the spring seat 64 provided by the projection 47 towards the push rod 30, such that the lowest diameter of the return spring 60 is provided at the lateral end 64 of the return spring 60 that is engaged with the push rod 30.

As shown in FIGS. 3 and 4, the casing 10 has a mounting interface 12 and the guiding member 40 has the mounting interface 42 such that the guiding member 40 is engaged with the casing 10 in a non-positive connection by a press fit.

Figure 5:
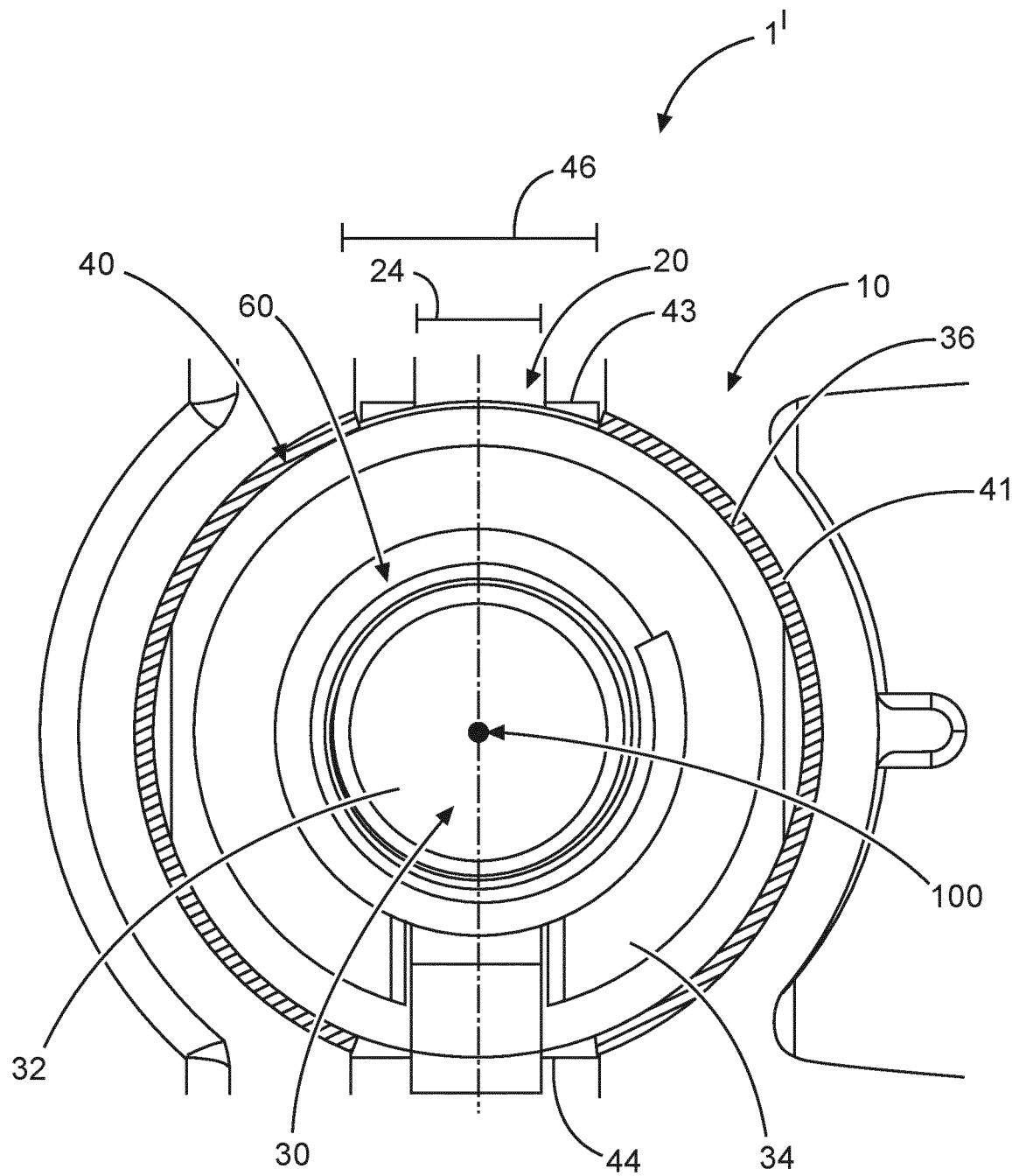
FIG. 5 is a front view of the brake actuator according to FIG. 3.

As shown in FIG. 5, the contact surface 41 of the guiding member 40 is cylindrical and the contact surface 36 of the push rod 30 has a curvature that corresponds to the curvature of the contact surface 41.

The slots 43, 44 provided at the guiding member 40 have the width 46 that corresponds to the thickness 24 of the cam disc 20, wherein the width 46 is larger than the thickness 24 such that a tolerance is provided that is required due to clearance in the rotatable coupling of the cam disc 20 and the casing 10.

Figure 6:
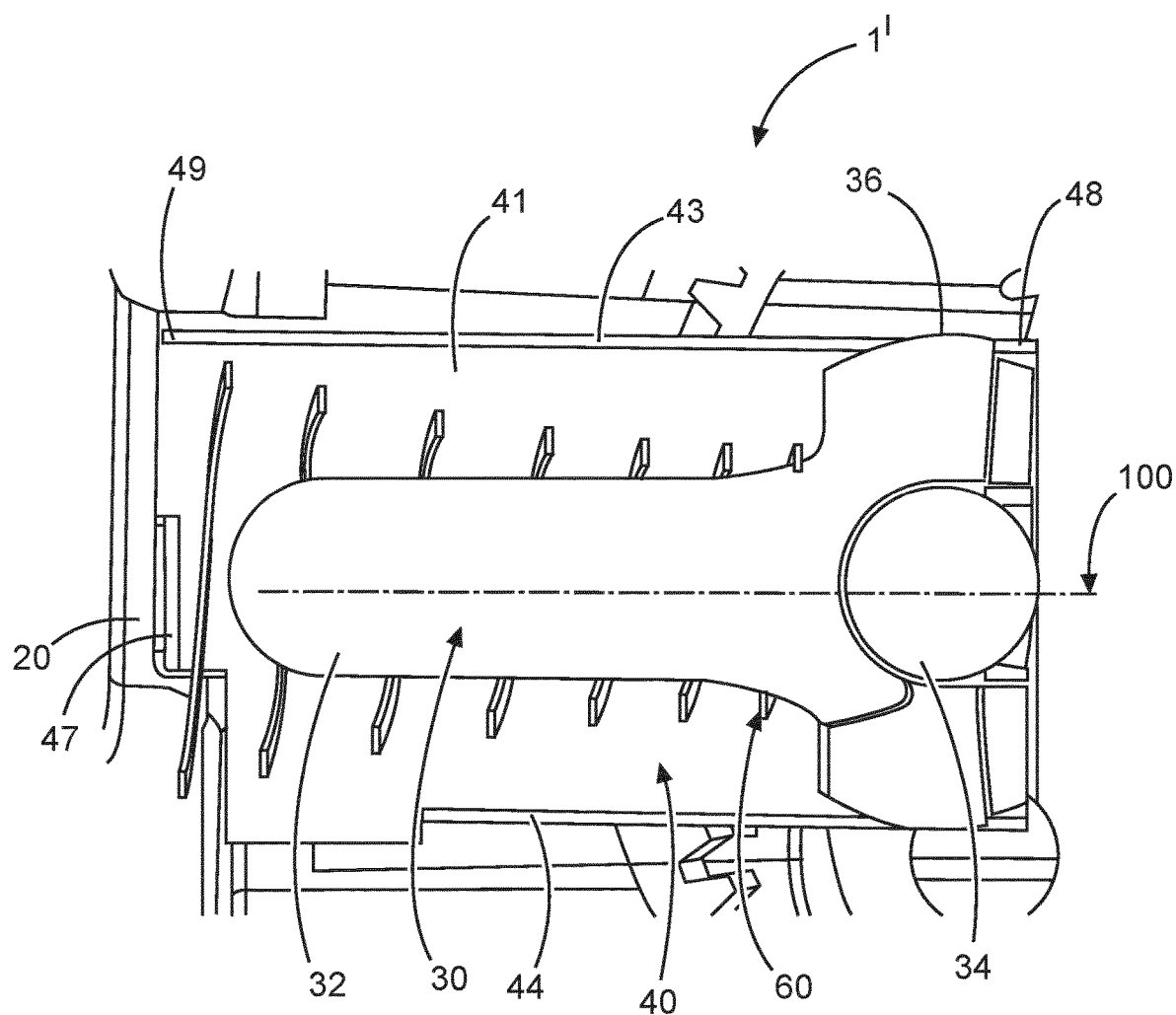
FIG. 6 is a sectional side view of the brake actuator according to FIG. 3.

As best shown in FIG. 6, the contact surface 36 of the push rod 30 is partially spherical enabling an inclination of the push rod 30 inside the guiding member 40 due to the rotational movement of the cam disc 20 or the pivoting movement of the lever 50. The outer diameter of this partially spherical contact surface 36 corresponds to the inner diameter of the contact surface 41 of the guiding member 40 such that the push rod 30 is guided in longitudinal direction 100.

The detailed description above illustrates and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further, the features described in the description, the drawings and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality. For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further, the features described in the description, the drawings and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

LIST OF REFERENCE SIGNS (PART OF DESCRIPTION)

1 brake actuator
10 casing
12 first mounting interface
20 cam disc
22 coupling surface of the cam disc
24 thickness
30 push rod
32 rod portion
34 guiding portion
36 contact surface
38 coupling surface of the push rod
40 guiding member
41 first contact surface
42 second mounting interface
43 first slot
44 second slot
46 width
47 projection
48 first face end
49 second face end
50 pivot lever
60 return spring
62 lateral end
64 spring seat
100 longitudinal direction
300 retracted position
400 extended position

The invention claimed is:

1. A brake actuator (1, 1') comprising:
a casing (10),
an electric motor for providing a driving torque,
a cam disc (20) rotatably mounted to the casing (10), wherein the cam disc (20) is operatively coupled to the electric motor,
a push rod (30) disposed in the casing (10), the push rod configured to reciprocate in a longitudinal direction (100) between a retracted position (300) and an extended position (400),
wherein the push rod (30) and the cam disc (20) are operatively coupled such that a rotational movement of the cam disc (20) causes a linear movement of the push rod,
wherein a guiding member (40) is mounted to the casing (10), wherein the guiding member is a bushing;
wherein the guiding member (40) is configured to guide movement of the push rod (30) in longitudinal direction (100);
wherein the guiding member (40) has at least one slot (43) extending in the longitudinal direction (100).

2. The brake actuator (1, 1') according to claim 1, wherein the guiding member (40) has a first contact surface (41), and the push rod (30) has a corresponding second contact surface (36) that is in sliding contact with the first contact surface (41).

3. The brake actuator (1, 1') according to claim 2, wherein the first contact surface (41) is curved.

4. The brake actuator (1, 1') according to claim 3, wherein the second contact surface (36) has a corresponding curvature.

5. The brake actuator according to claim 4, wherein the second contact surface (36) is part spherical having an outer diameter, the first contact surface (41) is part cylindrical or cylindrical, wherein the first contact surface (41) and the second contact surface (36) have a corresponding curvature, wherein the part spherical second contact surface (36) enables an inclination of the push rod (30) inside the guiding member (40).

6. The brake actuator (1, 1') according to claim 1, wherein the slot (43) is a first slot and the guiding member (40) further has a second slot (44) extending in longitudinal direction (100), wherein the second slot (44) is arranged opposite to the first slot (43), and
wherein the first slot (43) and second slot (44) are configured to receive the cam disc (20) at least partially.

7. The brake actuator (1, 1') according to claim 6, wherein the first slot (43) and second slot (44) have a width (46) that corresponds to the thickness (24) of the cam disc (20).

8. The brake actuator according to claim 6, wherein the cam disc (20) extends through the first slot (43) when the push rod (30) is in the extended position and the cam disc (20) extends through the second slot (44) when the push rod (30) is in the retracted position.

9. The brake actuator (1, 1') according to claim 1, wherein the guiding member (40) is at least partially arranged in the casing (10).

10. The brake actuator (1, 1') according to claim 1, wherein the guiding member (40) is mounted to the casing (10) in a non-positive connection.

11. The brake actuator according to claim 10, wherein the casing (10) has a first mounting interface (12) and the guiding member has a second mounting interface (42), wherein the second mounting interface (42) engages with the first mounting interface (12) in a press fit.

12. The brake actuator (1') according to claim 1, wherein the brake actuator (1') further comprises:

a return spring (60) operatively coupled to the push rod (30), wherein the return spring urges the push rod (30) towards its retracted position (300).

13. The brake actuator (1') according to claim 12, wherein the guiding member (40) has a first face end (48) facing the cam disc (20) and a second face end (49) facing away from the cam disc (20), and the guiding member has (40) a projection (47) at the second face (49) end extending radially inwards.

14. The brake actuator (1, 1') according to claim 13, wherein return spring (60) is mounted inside the guiding member (40) against the projection (47).

15. The brake actuator according to claim 14, wherein the return spring (60) encloses a rod portion (32) of the push rod (30) at a lateral end (62) of the return spring (60), and the projection (47) defines a spring seat (64) for the return spring (60).

16. The brake actuator according to claim 15, wherein the return spring (60) has a diameter that tapers from the spring seat (64) to the lateral end (62) such that the lowest diameter is provided at the lateral end (62).

17. The brake actuator (1, 1') according to claim 1, wherein the guiding member (40) is formed partially or completely of a material having a high strength and a low friction coefficient.

18. The brake actuator (1, 1') according to claim 1, wherein the brake actuator (1, 1') further comprises:
a pivot lever (50) configured for applying a braking force on a brake disc,
wherein the pivot lever (50) and the push rod (30) are engaged such that the linear movement of the push rod (30) advances a pivoting movement of the lever (50).

19. A method of using the brake actuator (1, 1') according to claim 1,
wherein the casing (10) has a first mounting interface (12), and the guiding member (40) has a second mounting interface (42) that corresponds to the first mounting interface (12),
engaging the second mounting interface (42) with the first mounting interface (12) and mounting the guiding member (40) to the casing (10),
guiding the movement of the push rod (30) in the longitudinal direction (100) by using the guiding member.

* * * * *